O. NICHOLS.
Grist Mill.
No. 9,330.
Patented Oct. 12, 1852.
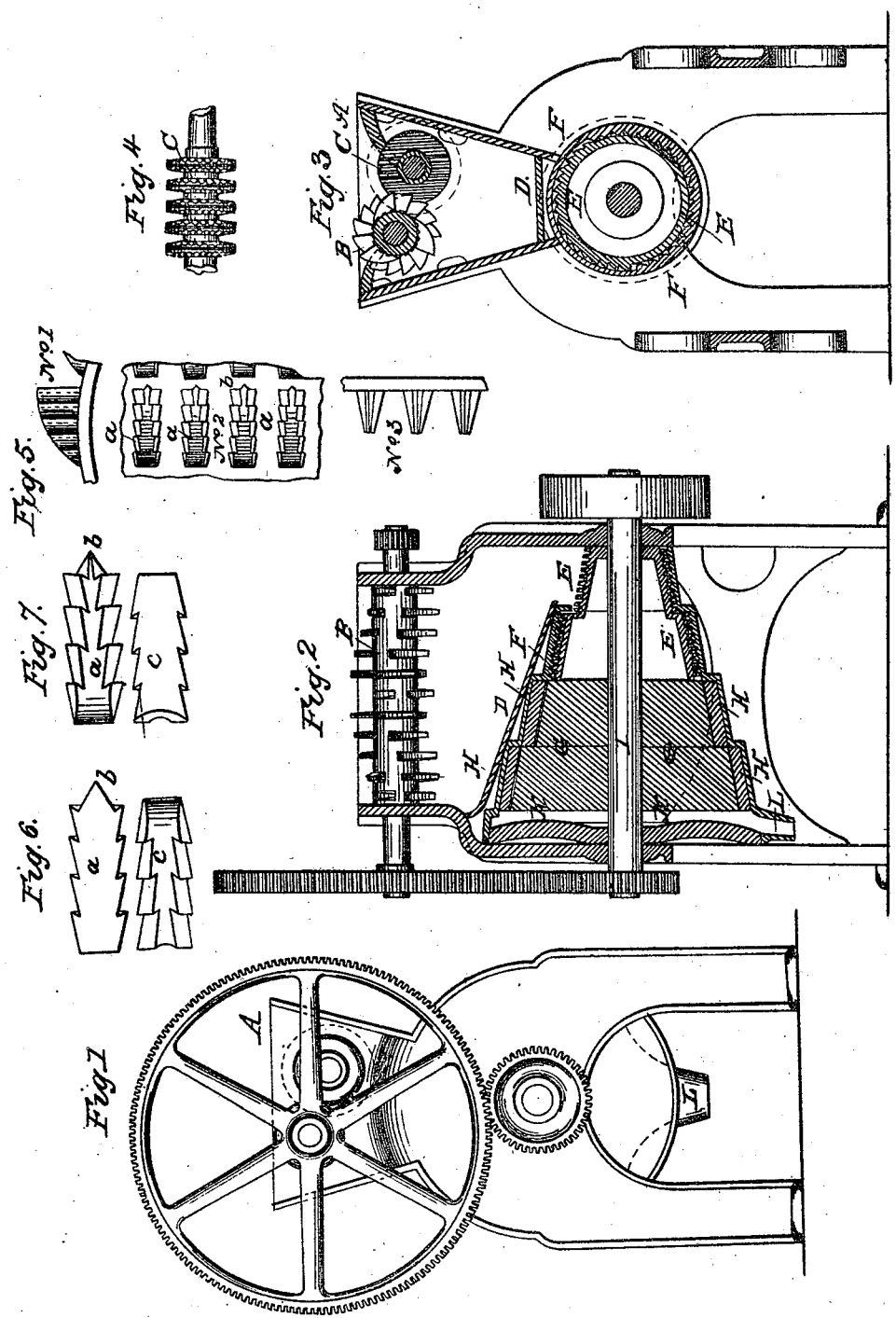

UNITED STATES PATENT OFFICE.

OLDIN NICHOLS, OF LOWELL, MASSACHUSETTS.

GRINDING-MILL.

Specification of Letters Patent No. 9,330, dated October 12, 1852.

*To all whom it may concern:*

Be it known that I, OLDIN NICHOLS, of Lowell, in the county of Middlesex and State of Massachusetts, have invented a new and useful Machine for Crushing and Grinding Cobs, Corn, and other Substances; and I do hereby declare that the following is a full and exact description thereof, reference being had to the accompanying drawings, making a part of this specification, Figure 1 being an end view; Fig. 2, a longitudinal vertical section; Fig. 3, a transverse vertical section, and Figs. 4, 5, 6, and 7, are views of detached portions of the machine.

Similar letters indicate like parts in all the figures.

The grain, or other substance to be acted upon, is put into the hopper A, and rests upon the cylinders B, and C; it is first operated upon by the teeth on the cylinder B, passing into annular grooves in the cylinder C. The sides of the said grooves in the cylinder B, may be either smooth or corrugated. Series of teeth on one cylinder acting into continuous grooves in the periphery of another cylinder, I find to be much more efficient and rapid for crushing and grinding purposes, than when the teeth on the said cylinder act between series of teeth on another cylinder. The teeth on the cylinder B, are so arranged that they will successively fall into action one after the other, and also have a centralizing influence upon the substance acted upon, for the purpose of equalizing the strain upon the bearings of the cylinders B, and C, and also equally distributing the power required to operate the same. The cylinder C may be geared to the cylinder B,—or may receive its motion from the action of the teeth of the latter, when performing their crushing duty upon substances by forcing them between the grooves of the former.

The cobs, corn, or other substances, will be thoroughly cut up by passing between the cylinders B, and C, and will thence fall upon the inclined plane D,—Figs. 2 and 3—and be conveyed thereby to the secondary grinding apparatus composed of the toothed conical cylinder E, working into the toothed concave F.

The form of tooth *a*, used upon the cylinder E, is represented in Fig. 5;—and it is also shown in Figs. 6 and 7, double the size that are generally made use of. The sides of the said cylinder tooth *a*, are corrugated, and a point *b*, projects from its front edge, for the purpose of preventing a kernel of corn, or a piece of cob, from lodging and being carried forward upon the front edge of the tooth, and being discharged from the machine in an unbroken state, as is frequently the case with other machines.

The teeth *c*, used in the concave F, correspond in shape with those used on the cylinder E, with the exception that their front edges are hollowed out into a concave form, and have no points projecting from them.

The cavities in the front edges of the teeth in the concave F, are for the purpose of obstructing the free forward motion of the substance operated upon, and thereby increasing the action of the corrugated surfaces of the cylinder teeth.

On the same shaft with the cylinder E, I sometimes place a mill stone G, and combine therewith the concave H, adapted to its periphery, for the purpose of acting a third time upon the cobs, corn, or other substances, when a greater degree of fineness is required.

What I claim as my invention and desire to secure by Letters Patent, is—

The pointed projections *b*, on the front edges of the teeth of the cylinder E, when used in combination with the teeth *c, c*, in the concave formed with concavities in their front edges, substantially in the manner and for the purpose herein set forth.

The above specification of my improved machine for crushing and grinding cobs, corn, and other substances signed June 1852.

OLDIN NICHOLS.

Witnesses:
J. C. ABBOTT,
BENJAMIN RICHARDSON.